G. O. BURWELL & C. M. KURTZ.
TROLLEY.
APPLICATION FILED SEPT. 19, 1914.
1,154,234.
Patented Sept. 21, 1915.
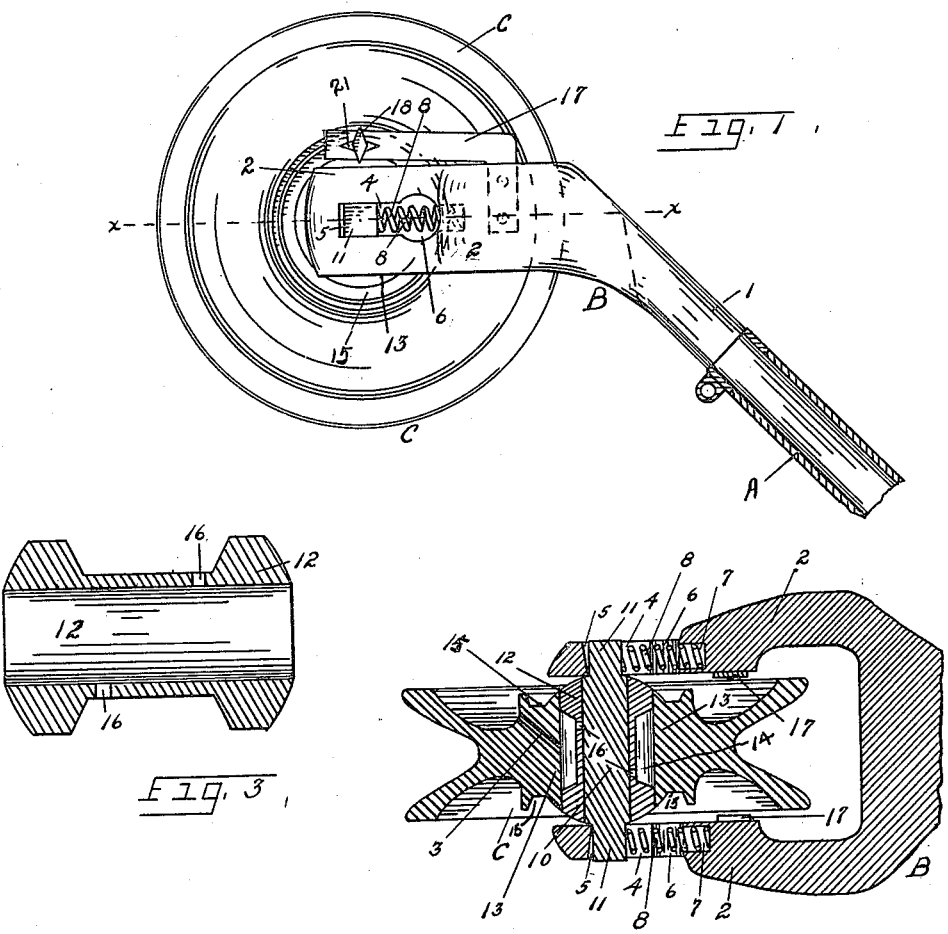

UNITED STATES PATENT OFFICE.

GEORGE O. BURWELL, OF SALT LAKE CITY, UTAH, AND CHARLES M. KURTZ, OF BELLEVUE, PENNSYLVANIA.

TROLLEY.

1,154,234.        Specification of Letters Patent.        Patented Sept. 21, 1915.

Application filed September 19, 1914. Serial No. 862,611.

*To all whom it may concern:*

Be it known that we, GEORGE O. BURWELL, a citizen of the United States, residing at Salt Lake City, in the county of Salt Lake and State of Utah, and CHARLES M. KURTZ, a citizen of the United States, and residing at Bellevue, Pennsylvania, have invented certain new and useful Improvements in Trolleys, of which the following is a specification.

Our invention relates to overhead trolleys for electric railways, and has for its object to provide a simple, efficient and economical trolley whereby a more positive electric circuit is formed through the trolley and a means provided to prevent injury to the stay wires of the line should the trolley leave the line wire.

The invention also has for its object to provide a mounting for the trolley wheel which will allow said wheel to automatically adapt itself to curves and switches in the line wire to prevent the wheel from leaving the wire, and a bushing forming an oil cup therefor.

These objects we accomplish with the device illustrated in the accompanying drawings in which similar letters and numerals of reference indicate like parts throughout the several figures, and as described in the specification forming a part of this application and pointed out in the appended claims.

In the drawings in which we have shown a substantial embodiment of our invention, Figure 1 is a side elevation of the device, parts broken away. Fig. 2 is a horizontal section on line *x x* of Fig. 1. Fig. 3 is a longitudinal section of the bushing for the wheel. Fig. 4 is a plan view of one of the contact springs, and Fig. 5 is a side elevation of one of the detachable contact shoes.

Referring specifically to the drawings, A, denotes a fragment of a trolley pole which is mounted in the ordinary manner on the car. In the free end of said pole our trolley harp B is secured. The said harp B consists of a standard 1, positioned at an incline when the trolley is on the line wire and having horizontally disposed arms 2, between which arms the trolley wheel C is journaled on the detachable axle or shaft 10. The arms 2 of the harp have longitudinally disposed slots 4 cut therein, with the outer end wall of each slot beveled outwardly as at 5, and the inner or back portion of each slot enlarged by a circular hole as at 6. The circular end of each slot is further extended by a tapped hole 7, within which hole a portion of the axle springs 8 are seated. The upper edge of each of said arms 2 is above the axis of said trolley wheel; and near the junction of said arms said edges are lowered but at all points are above the axis of said wheel, and act as a guard to prevent stay wires from being caught and broken should the trolley wheel leave the line. With our construction the trolley pole and wheel will pass under the guard wires without injury to the guard or line wires should the trolley leave the line wire.

The wheel C is loosely mounted on an axle 10 which is carried by said arms 2. The end portions of said axle are squared as shown at 11, and operate in said slots 4. The said wheel C is provided with a spool shaped bushing 12 having its medial portion spaced from the hub 13 of said wheel to provide an oil chamber 14. An oil ingress 3 is bored through the hub 13 by which oil is inserted within said chamber 14, and oil holes 16 are provided through the medial portion of said bushing 12 to allow the oil to lubricate the said axle 10. The ends of said bushing 12 and of said hub 13 are given a semispherical form to allow horizontal play or movement of the axle 10 and thereby of the wheel C, to permit said wheel to follow the line wire on curves and switches. To accommodate this horizontal movement of said axle at either end, said slots 4 are beveled as described at 5, and said springs 8 are carried in said slots bearing against the squared portion of said axle 10 to normally hold the axle transverse to said arms 2 and to yield at either end, thereby allowing the said wheel C to more closely follow the line wire as hereinbefore described. This construction allows us to use a larger wheel than is in ordinary use. Annular grooves 15 are cut in the web portion on each side of said wheel C within which are operated the detachable contact shoes D. Said shoes are carried and held in contact with said wheel C by the flat springs 17 which are fastened on the inside of said arms 2. Said contact shoes have one end portion extended laterally, as at 18, with the medial portion rounded, as at 19, and the contact end 20 enlarged and formed with sloping sides to conform to and bear in the said annular grooves 15. In order that said contact shoes may be detachably secured in the free ends of said springs 17 horizontally disposed slots 21 are cut in said springs which allow said shoes to be inserted from the inner side of said springs and turned on said rounded portion 19 as a pivot and the extended portions 18 to engage the outer faces of the springs with friction enough to hold them in place and the sloping sides of the enlarged ends 20 to bear in said annular grooves 15. We thus provide a positive circuit for the electric current from the line wire through the trolley without the current passing through the lubricated axle of the wheel as is usual. When said contact shoes D, which are preferably made of copper, wear out they may be replaced with others by pulling the free ends of said springs 17 outward or away from their proximity to said wheel C and the new shoes secured in place.

In assembling our device, the axle 10 is inserted through the circular hole 6 in the arms 2 and moved in the longitudinal slots 4 contiguous the beveled walls 5. The springs 8 are inserted at one end into the tapped hole 7 with their other ends bearing against the squared portion 11 of said axle. The contact shoes D are inserted from the back or rear side of the flat springs 17 by the portion 18 of said shoes being passed through the horizontal slots 21, and turned on the pivot portion 19 in transverse position to said springs, with the enlarged end 20 made to bear in the annular grooves 15.

Having thus described our invention we desire to secure by Letters Patent and claim:—

1. In a trolley the combination of a harp; an axle mounted therein; a wheel carried on said axle; annular grooves in the web portion of said wheel; springs secured at one end to said harp and having longitudinally disposed diamond shaped slots in their free end portions; and detachable contact shoes carried in said sloots and held in bearing contact against said wheel and within said grooves by said springs to carry electric current from a line wire to said harp.

2. In a trolley the combination of a harp; a wheel mounted therein having annular grooves in the web portion thereof; flat springs having one end of each secured to said harp and provided with a diamond shaped slot in their other ends; and contact points having one portion diamond shaped to pass freely through said diamond shaped slots and a cone shaped larger portion connected to said diamond shaped portion which contact points are held in said annular grooves by said springs.

3. In a trolley the combination of a harp; an axle mounted therein; a wheel mounted on said axle having annular grooves therein; and spring held detachable contact shoes adapted to bear in said grooves above the said axle.

4. In a trolley the combination of a harp having an inclined portion and horizontal arms; a wheel having annular grooves in the web portion thereof mounted in said arms; flat springs having one end of each secured to an adjacent one of said arms and adapted to conduct electricity; a detachable contact shoe carried in the free end of each of said springs and bearing against said wheel within one of said grooves at a point between the axle of said wheel and the point on the periphery of said wheel where it bears against the line wire.

5. In a trolley the combination of a harp; a wheel mounted therein having annular grooves cut in the web portion thereof; springs secured on the inner side of the arms of said harp with the free ends above the arms of the harp and provided with longitudinal slots therein; and detachable contact points carried by said springs within said slots and bearing against said wheel within said annular grooves.

In testimony whereof we have affixed our signatures in presence of two witnesses.

GEORGE O. BURWELL.
CHARLES M. KURTZ.

Witnesses:
SAM RANEY,
JOHN MARSH.

Copies of this patent may be obtained for five cents each, by addressing the "Commissioner of Patents, Washington, D. C."